US011541339B2

(12) United States Patent
Smith

(10) Patent No.: US 11,541,339 B2
(45) Date of Patent: Jan. 3, 2023

(54) PORTABLE AIR FILTER CLEANING DEVICES AND METHODS OF USE

(71) Applicant: John Albert Smith, La Mirada, CA (US)

(72) Inventor: John Albert Smith, La Mirada, CA (US)

( * ) Notice: Subject to any disclaimer, the term of this patent is extended or adjusted under 35 U.S.C. 154(b) by 622 days.

(21) Appl. No.: 16/390,770

(22) Filed: Apr. 22, 2019

(65) Prior Publication Data

US 2019/0321762 A1    Oct. 24, 2019

Related U.S. Application Data

(60) Provisional application No. 62/660,960, filed on Apr. 21, 2018.

(51) Int. Cl.
| | | |
|---|---|---|
| *B01D 41/00* | (2006.01) | |
| *B01D 41/04* | (2006.01) | |
| *B08B 3/08* | (2006.01) | |
| *B01D 46/24* | (2006.01) | |

(52) U.S. Cl.
CPC ............... *B01D 41/04* (2013.01); *B08B 3/08* (2013.01); *B01D 46/24* (2013.01)

(58) Field of Classification Search
None
See application file for complete search history.

(56) References Cited

U.S. PATENT DOCUMENTS

| | | | | |
|---|---|---|---|---|
| 3,174,490 | A | * | 3/1965 | Flarsheim ............... B01D 41/04 134/155 |
| 3,608,567 | A | * | 9/1971 | Neill, Jr. ............... B01D 46/681 134/152 |
| 3,620,234 | A | * | 11/1971 | Everroad ............... B01D 41/04 134/86 |
| 3,958,298 | A | | 5/1976 | Cannan |
| 4,299,245 | A | * | 11/1981 | Clapper .................... B08B 3/02 118/318 |
| 5,078,763 | A | | 1/1992 | Blount-Gillette |
| 6,588,057 | B2 | | 7/2003 | McMahon |
| 2010/0088844 | A1 | * | 4/2010 | Cole .................. B01D 46/0068 15/405 |
| 2011/0005176 | A1 | | 1/2011 | Grieve |
| 2012/0260954 | A1 | | 10/2012 | Southwell et al. |
| 2013/0056035 | A1 | * | 3/2013 | Kraai ..................... B01D 47/06 134/25.1 |
| 2014/0251387 | A1 | | 9/2014 | Royce et al. |

* cited by examiner

*Primary Examiner* — Cristi J Tate-Sims
(74) *Attorney, Agent, or Firm* — Blynn L. Shideler; Krisanne Shideler; BLK Law Group

(57) ABSTRACT

A portable air filter cleaning device includes a housing configured to receive an air filter to be cleaned, at least one spray mechanism within the housing for spraying fluid onto the air filter to be cleaned within the housing, a cleaning fluid reservoir coupled to at least one spray mechanism for selectively spraying cleaning fluid onto the air filter to be cleaned within the housing, a rinsing fluid reservoir coupled to at least one spray mechanism for selectively spraying rinsing fluid onto the air filter to be cleaned within the housing; and a motor for facilitating cleaning, rinsing and drying of the air filter to be cleaned. The device may be rotational for cylindrical type air filters or designed for cleaning flat plate type air filters. An associated method of cleaning an air filter is disclosed.

15 Claims, 4 Drawing Sheets

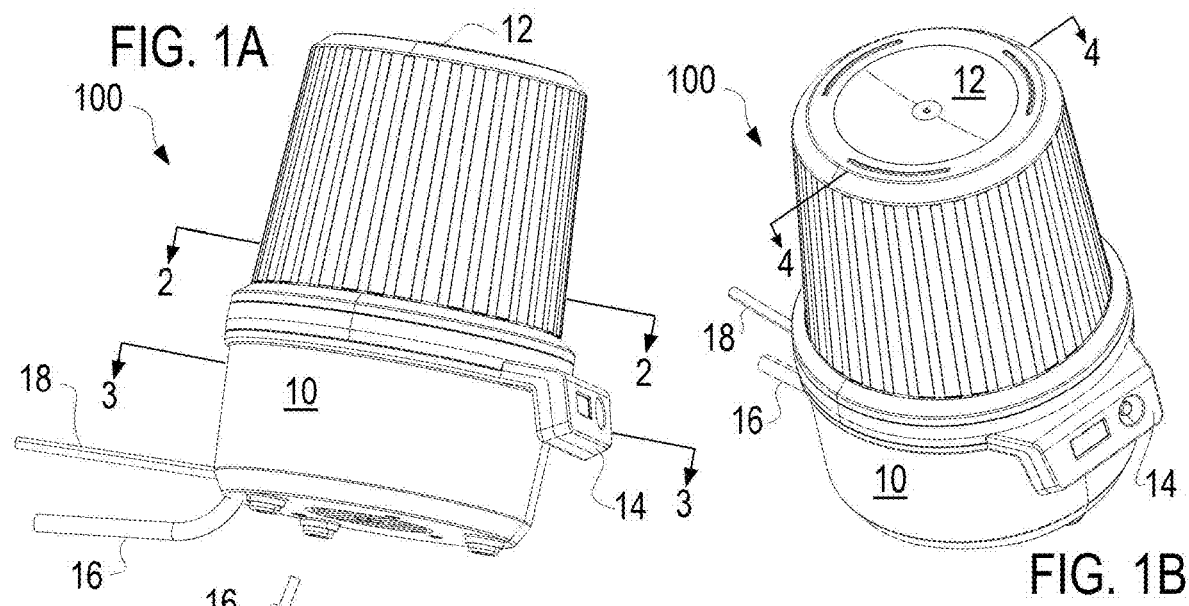
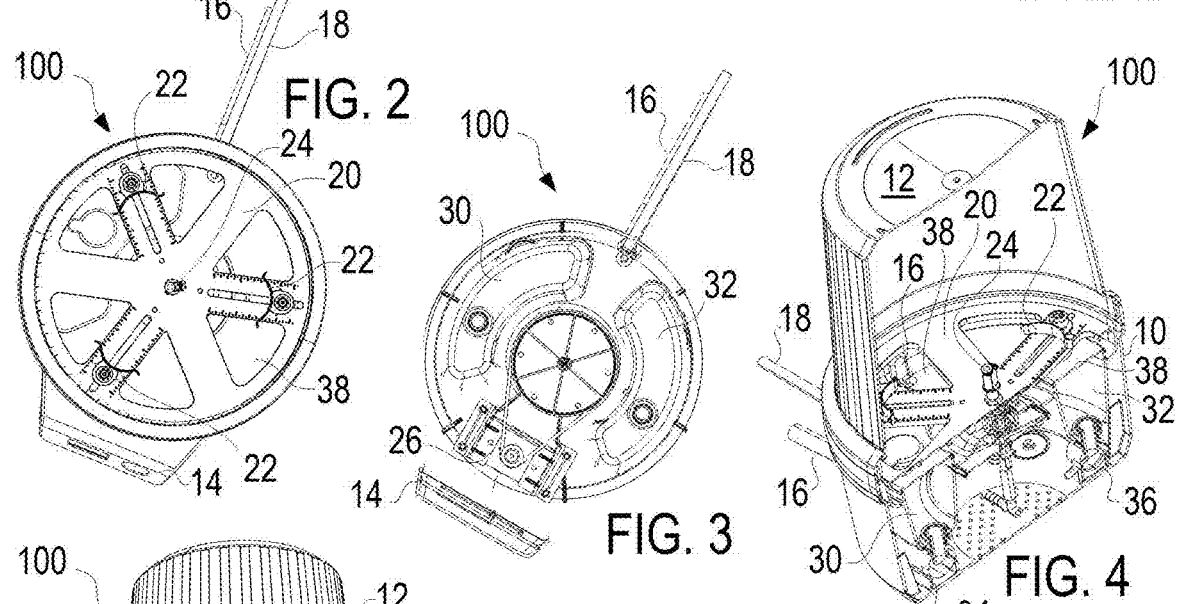
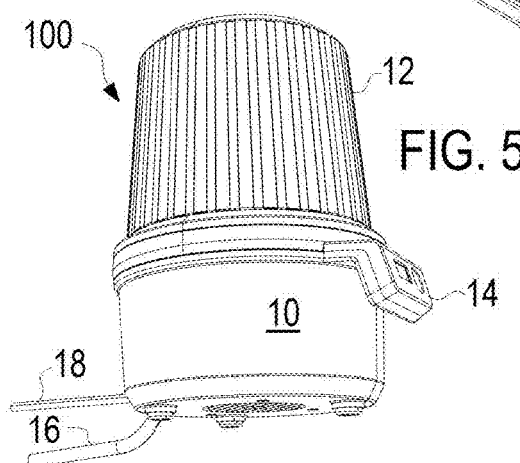
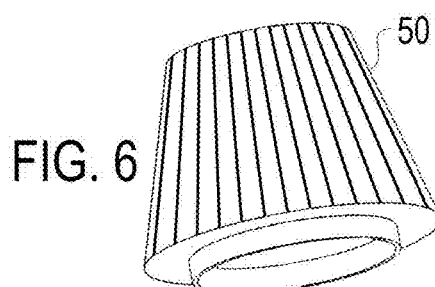

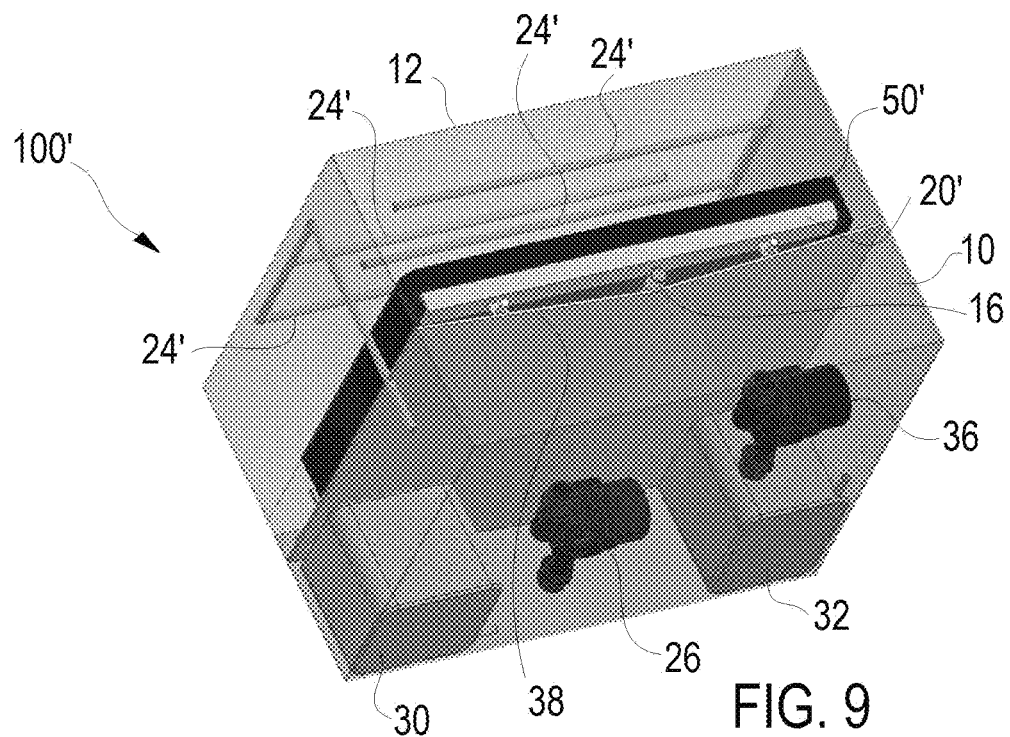
FIG. 9
FIG. 10
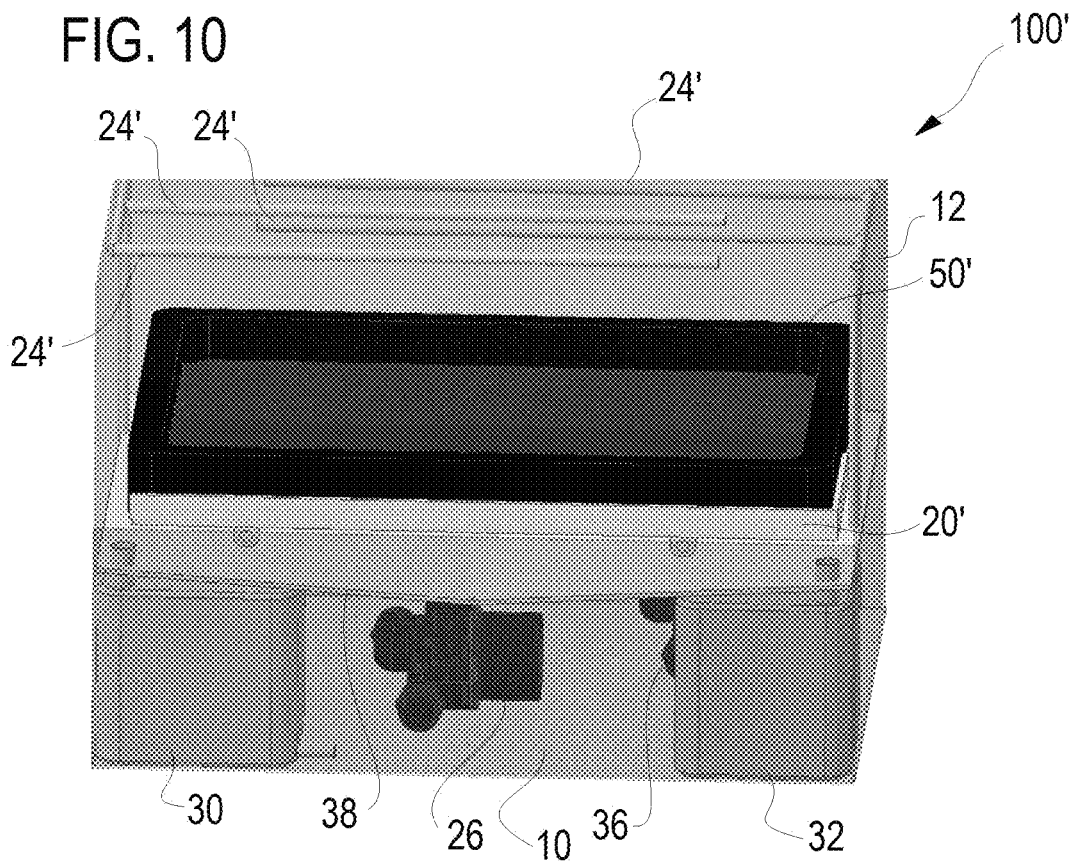

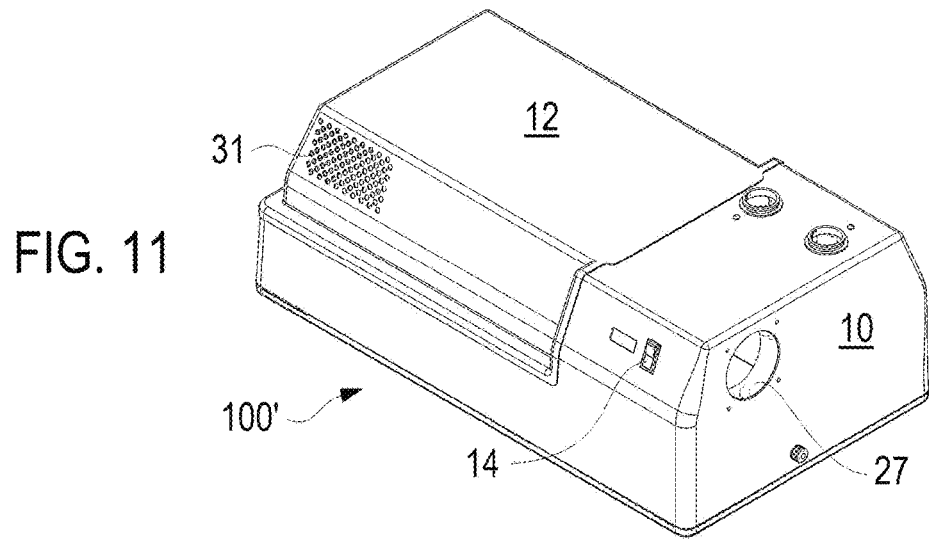
FIG. 11
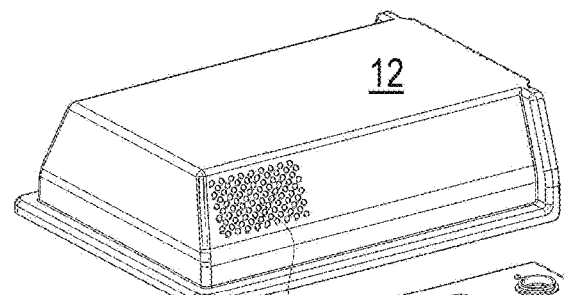
FIG. 12
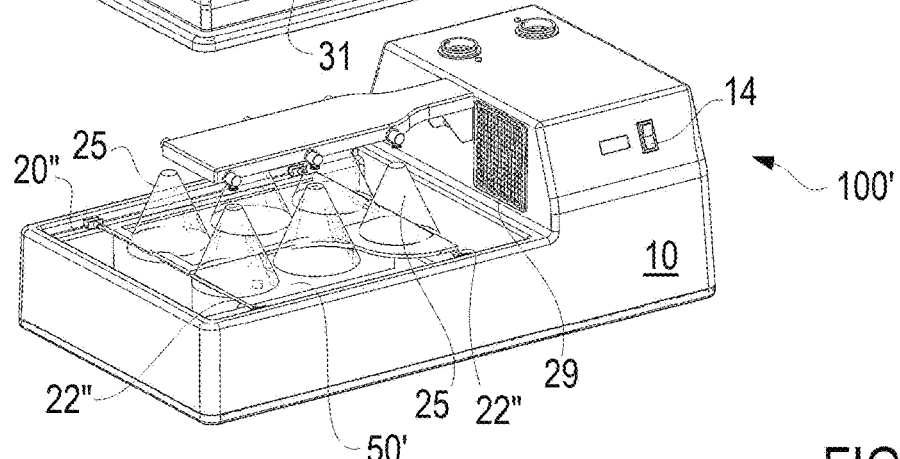
FIG. 13
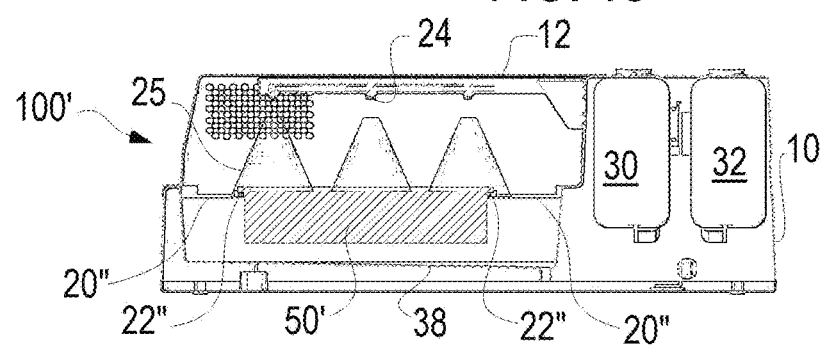

PORTABLE AIR FILTER CLEANING DEVICES AND METHODS OF USE

RELATED APPLICATIONS

This application claims priority to U.S. patent application Ser. No. 62/660,960, filed Apr. 21, 2018 entitled "Air Filter Cleaning Device and Methods of Use" which is incorporated herein by reference.

BACKGROUND INFORMATION

1. Field of the Invention

The presently disclosed subject matter relates generally to processing reusable air filters and more particularly to a portable air filter cleaning devices and methods of use.

2. Background Information

As is generally well known, air filters are used extensively to prevent particulate impurities such as dust and dirt from entering into the combustion chambers of engines. When the particulate build-up becomes significant, the air flow through the filtering medium is restricted causing abnormal operation of the combustion engine that increases operating costs and may potentially result in engine stalling or failure.

In heavy off-road and over the road vehicles, it is common for air filters to accumulate undesirable amount of particulate in a relatively short span of time. Thus, these air filters need frequent attention to maintain the required air flow. However, air filter replacement is usually prohibitive due to cost of the new air filter requiring the operators of such vehicles to periodically clean air filters.

One manual cleaning method is to repeatedly strike the air filter against a rigid structure to dislodge the particulate. However, it has been found that such method does not remove all accumulated particulate and can inadvertently damage the filter. Other known manual methods of cleaning dirty air filters can be messy, time consuming, and ineffective.

Another method involves use of an air hose with the nozzle inserted into the inner aperture or cavity of the air filter. However, the air may be discharged through the nozzle at higher than desirable pressure capable of damaging the filtering medium and requires greater than desirable effort and concentration by the operator to adequately clean the air filter without damaging filtering medium.

U.S. Pat. No. 5,078,763 discloses one type of a portable air filter cleaning device that includes an aperture containing vertical column connected to a high pressure air hose, where an annular air filter is placed around the vertical column and air is then forced into the vertical column, exiting through the apertures and through the filter itself, forcing any accumulated particles off the surface of the filter.

U.S. Pat. No. 3,958,298 discloses another type of the portable filter cleaning device that includes a housing receiving the air filter to be cleaned. An upper member is provided with a vertically depending rotatable pipe provided with radially directed nozzles. The pipe is also provided with a pair of nozzles directed at an angle to the radial to provide a rotary movement to the pipe means. The air filter cleaner may be operated from air compressors readily available on the job site, such as compressors on the heavy construction equipment itself.

U.S. Pat. No. 6,588,057 discloses yet another type of the portable air filter cleaning device that includes an elongated, readily gripped handle having a through bore and a connector at one end for coupling to an air supply hose, and a rotary head is rotatably mounted on the other end of the handle. The rotary head has an internal air distribution chamber with small outlet openings in its outer peripheral wall for spraying air from the chamber. The rotating head sprays air outwardly across the surface of an air filter unit to dislodge dirt from filter paper in a filter unit U.S. Patent Publication 2011-0005176 discloses an apparatus for cleaning an air filter which includes a body defining a closed chamber and a fluid disperser rotating within the body and passing through the chamber. Fluid supplied under pressure to the fluid disperser exits through a plurality of orifices or nozzles toward an inner surface of an air filter filtering medium causing contaminants to exit therefrom.

U.S. Patent Publication 2012-0260954 discloses a portable air filter cleaning device including a frame supporting a rotatable air filter receiver. A tube coupled to a water line directs water to impact a washable air filter mounted upon the air filter receiver and causes rotation thereof.

U.S. Patent Publication 2014-0251387 discloses a filter cleaning device that includes a cleaning chamber operable to receive a gas filter to be cleaned, the cleaning chamber having airflow that is forced to pass through at least a part of the filter when inserted, the filter cleaning device further comprising a mechanical agitation arrangement operable, in one mode of operation, to generate a linear oscillation along an axis of the filter when inserted and, in another mode of operation, to rotate the filter about an axis of rotation.

The above described air cleaner devices are essentially only usable with paper or dry air filters and generally do not work with an oil impregnated substrate.

There remains a need for an improved portable apparatus for cleaning air filters in a simple, efficient and cost effective system that overcomes the deficiencies of the existing systems.

SUMMARY OF THE INVENTION

One aspect of this invention is directed to a portable air filter cleaning device includes a housing configured to receive an air filter to be cleaned, at least one spray mechanism within the housing for spraying fluid onto the air filter to be cleaned within the housing, a cleaning fluid reservoir coupled to at least one spray mechanism for selectively spraying cleaning fluid onto the air filter to be cleaned within the housing, a rinsing fluid reservoir coupled to at least one spray mechanism for selectively spraying rinsing fluid onto the air filter to be cleaned within the housing; and a motor for facilitating cleaning, rinsing and drying of the air filter to be cleaned.

The portable air filter cleaning device according to one aspect of the invention further includes a rotating plate within the housing and selectively supporting the air filter, wherein the rotating plate is selectively driven by the motor for rotating the air filter to be cleaned, and an adaptor on the rotating plate sized to the air filter to be cleaned. The portable air filter cleaning device according to one aspect of the invention may provide wherein the adaptor on the rotating plate is an adjustable adaptor having a plurality of radially adjusting members on the rotating plate. The invention may provide that the motor is configured to rotate the rotating plate and air filter to be cleaned at a first speed for cleaning and rinsing of the air filter to be cleaned and a higher speed for drying of the air filter to be cleaned.

The portable air filter cleaning device according to one aspect of the invention may include wherein at least one spray mechanism includes at least one nozzle configured to spay an internal surface of the air filter to be cleaned, and including a pair of nozzles with outlets angled relative to each other to spray distinct portions of the air filter to be cleaned.

The portable air filter cleaning device according to the invention may further include a catch pan configured to receive debris from the air filter to be cleaned and cleaning fluid and rinsing fluid used to clean the air filter, and a drain line coupled to the catch pan and exiting the housing.

The portable air filter cleaning device according to invention may include a pump coupled to the cleaning fluid reservoir for pumping cleaning fluid to at least one spray mechanism for selectively spraying cleaning fluid onto the air filter to be cleaned within the housing, and a pump coupled to the rinsing fluid reservoir for pumping rinsing fluid to at least one spray mechanism for selectively spraying rinsing fluid onto the air filter to be cleaned within the housing. The portable air filter cleaning device according to the invention may provide wherein the device is configured to operate via an external power source.

The portable air filter cleaning device according to one aspect of the invention may provide wherein the at least one spray mechanism within the housing for spraying fluid onto the air filter to be cleaned within the housing includes at least one cleaning fluid nozzle coupled to the cleaning fluid cleaning fluid reservoir for selectively spraying cleaning fluid onto the air filter to be cleaned within the housing, and at least one rinsing fluid nozzle coupled to the a rinsing fluid reservoir for selectively spraying rinsing fluid onto the air filter to be cleaned within the housing.

The portable air filter cleaning device according to one aspect of the invention may further include a fan inducing airflow within the housing wherein the motor is coupled to the fan and selectively operates the fan inducing airflow within the housing and through the air filter to be cleaned for facilitating cleaning, rinsing and drying of the air filter to be cleaned.

One aspect of this invention is directed to a method of cleaning an air filter comprising the steps of providing a portable air filter cleaning device having a housing configured to receive an air filter to be cleaned, at least one spray mechanism within the housing, a cleaning fluid reservoir, a rinsing fluid reservoir and a motor; placing the air filter to be cleaned within the housing; spraying cleaning fluid from the cleaning fluid reservoir onto the air filter to be cleaned by at least one spraying device; spraying rinsing fluid onto the air filter to be cleaned by at least one spraying device; drying the air filter; and operating the motor to facilitate the spraying of the cleaning fluid the spraying of the rinsing fluid and the drying of the air filter.

The method of cleaning an air filter according to one aspect of the invention may further include the steps of draining from the housing debris from the air filter to be cleaned and cleaning fluid and rinsing fluid used to clean the air filter. The method of cleaning an air filter according to one aspect of the invention may further include the step inducing airflow within the housing with a fan, wherein the motor is coupled to the fan and selectively operates the fan inducing airflow within the housing and across and/or through the air filter to be cleaned for facilitating cleaning, rinsing and drying of the air filter to be cleaned. The method of cleaning an air filter according to one aspect of the invention may further include the step of selectively supporting the air filter on a rotating plate within the housing, wherein the rotating plate is selectively driven by the motor for rotating the air filter to be cleaned for facilitating cleaning, rinsing and drying of the air filter to be cleaned.

The features that characterize the present invention are pointed out with particularity in the claims which are part of this disclosure. These and other features of the invention, its operating advantages and the specific objects obtained by its use will be more fully understood from the following detailed description in connection with the attached figures.

BRIEF DESCRIPTION OF THE FIGURES

FIGS. 1A and 1B are perspective views of a portable air filter cleaning device according to one embodiment of the present invention;

FIG. 2 is a sectional plan view of the portable air filter cleaning device of FIGS. 1A and 1B taken along line 2-2 of FIG. 1A;

FIG. 3 is a sectional plan view of the portable air filter cleaning device of FIGS. 1A and 1B taken along line 3-3 of FIG. 1A; and FIG. 4 sectional side view of the portable air filter cleaning device of FIGS. 1A and 1B taken along line 4-4 of FIG. 1B;

FIG. 5 is a perspective view of the portable air filter cleaning device of FIGS. 1A and 1B;

FIG. 6 is a perspective view of a type of cylindrical air filter to be cleaned in the portable air filter cleaning device of FIGS. 1A and 1B;

FIG. 9 is a perspective view of a portable air filter cleaning device according to another embodiment of the present invention;

FIG. 10 is a perspective view of the portable air filter cleaning device of FIG. 9;

FIG. 11 is a perspective view of a portable air filter cleaning device according to another embodiment of the present invention;

FIG. 12 is a perspective partially exploded view of the portable air filter cleaning device of FIG. 11; and FIG. 13 is a schematic section view of the portable air filter cleaning device of FIG. 9.

DESCRIPTION OF THE PREFERRED EMBODIMENTS

Figure 7:
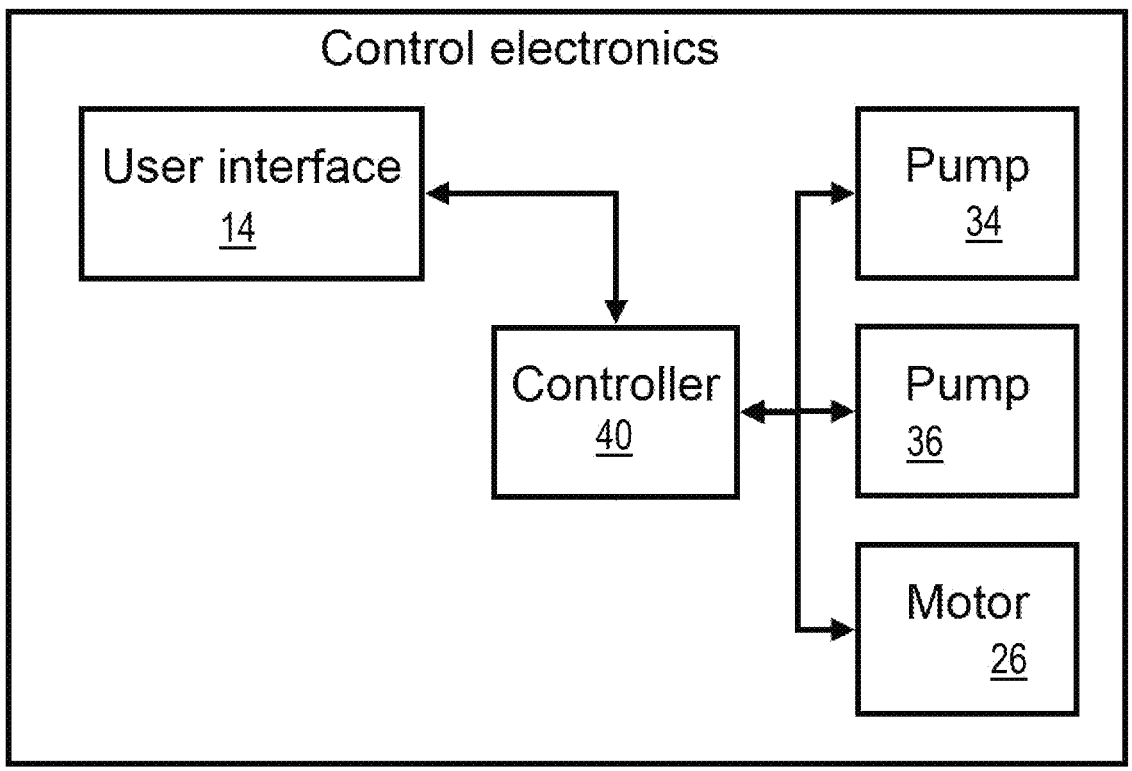
FIG. 7 is a schematic diagram of the control of the portable air filter cleaning device of the present invention.

The present invention relates to a portable air filter cleaning device 100 (FIGS. 1-5, and 8) or 100' (FIGS. 9-10). As further detailed below the portable air filter cleaning devices 100 and 100' (FIGS. 9-10) include a housing 10 (which includes a cover 12) configured to receive an air filter 50, 50' to be cleaned; at least one spray mechanism 24, 24' within the housing 10 for spraying fluid onto the air filter 50, 50' to be cleaned within the housing 10; a cleaning fluid reservoir 30 coupled to at least one spray mechanism 24, 24' for selectively spraying cleaning fluid onto the air filter 50, 50' to be cleaned within the housing 10; a rinsing fluid reservoir 32 coupled to at least one spray mechanism 24, 24' for selectively spraying rinsing fluid onto the air filter 50, 50' to be cleaned within the housing 10; and a motor 26 for facilitating cleaning, rinsing and drying of the air filter 50, 50' to be cleaned. The devices 100, 100' of the present invention are designed to clean air filters 50, 50' that include an oil impregnated substrate.

FIGS. 1-5 detail a portable air filter cleaning device 100 according to one embodiment of the present invention designed for cylindrical air filters shown in FIG. 6. Often these cylindrical air filters 50 have a tapered (frusto-conical) shape as shown, which are broadly included herein under cylindrical type air filters 50. The air filter 50 is any air filter to be cleaned using the air filter cleaning device 100. The air filter 50 can be, for example, any round-straight (i.e. conventional cylinder shaped) or round-tapered (i.e. cone shaped as shown) air filter used, for example, in cars, trucks, ATVs, motorcycles, airplanes, boats, heavy equipment, and the like. Examples of these air filter are those available from K&N Engineering, Inc (Riverside, Calif.).

The portable air filter cleaning device 100 of FIGS. 1-5 includes a housing 10 having a removable cover 12. The housing 10 with cover 12 may be formed of any suitable material but molded plastic is likely the most cost effective for the device 100. The coupling of the cover 12 to the remaining portion of the housing 10 (the base) may be a friction fit, snap fit, threaded, or merely the weight of the cover 12 to hold it in place. The base of the housing 10 will substantially hold the operational components of the device 100 as discussed further below, while the cover 12 defines a cleaning chamber for the air filter 50 to be cleaned.

A user interface 14 or control panel is provided on the front portion of the housing 10 to allow for easy operation of the device 100 as discussed further below. The user interface 14 is coupled to a programmable controller 40 (shown schematically in FIG. 7) that is programmable, wherein the controller 40 controls the overall operations (e.g., wash cycle, rinse cycle, drying cycle, etc.) of the device 100. Also visible from the exterior of the housing 10 is a drain line 16 for draining from the housing 10 debris from the air filter 50 to be cleaned and cleaning fluid and rinsing fluid used to clean the air filter 50, and a power coupling 18 for connecting the device to a source of power. For example, the power coupling 18 may be in the form of a conventional electrical plug whereby the air filter cleaning device 100 can be powered using a standard electrical power supply. In yet another example, the power coupling 18 may be in the form a pair of leads with clips used to connect the air filter cleaning device 100 to a battery, such as a car type battery. In an alternative example, the air filter cleaning device 100 can be operated under internal battery power.

As best illustrated in FIG. 2 the device 100 of FIGS. 1-5 includes a rotating plate 20 within the housing 10 and selectively supporting the air filter 50, wherein the rotating plate 20 is selectively driven by the motor 26 as shown in FIG. 3 for rotating the air filter 50 to be cleaned. The motor 26 is mechanically coupled to plate 20 and may be, for example, a 12-volt DC, variable speed motor that is capable of, for example, up to about 12,000 RPMs although a number of suitable motors may be utilized.

The portable air filter cleaning device 100 of FIGS. 1-5 further includes an adaptor 22 on the rotating plate 20 sized to the air filter 50 to be cleaned. Specifically the adaptor 22 on the rotating plate 20 of the device 100 of FIGS. 1-5 is an adjustable adaptor 22 having an annular array of radially adjusting members on the rotating plate 20. The radially adjusting members of the adaptor are formed as stops riding in a radial slot that can be radially moved to a desired location sized to the air filter 50 being cleaned and locked in place. The top is a push button that when depress disengages teeth on the bottom of the spinning platen and can be moved in or out and the button released locking the clamp into place.

Three radially adjusting members spaced equidistant from each other are generally sufficient to hold the air filter 50 in location.

In the device 100 of FIGS. 1-5, the spray mechanism 24 extends through a center of the plate 20 and is stationary relative to the plate within the housing 10 for spraying fluid onto the interior of the air filter 50 being cleaned. The spray mechanism in the embodiment of FIGS. 1-5 is in the form of a pair of nozzles with outlets angled relative to each other to spray distinct portions of the interior of air filter to be cleaned, with one nozzle covering the top and upper portions of the air filter 50 and the other nozzle covering the lower portions of the air filter 50.

As discussed above, the cleaning fluid reservoir 30 is coupled to the spray mechanism 24 in the device 100 of FIGS. 1-5 for selectively spraying cleaning fluid onto the air filter 50 to be cleaned within the housing 10. A pump 34 is coupled to the cleaning fluid reservoir 30 for pumping cleaning fluid to the spray mechanism 24 for selectively spraying cleaning fluid onto the interior of the air filter 50 to be cleaned within the housing 12. The reservoir includes an opening and lid for refilling the reservoir 30 with appropriate cleaning fluid by the user. A representative example of the cleaning fluid to be placed in the reservoir 30 is the K&N air filter cleaner fluid included in the K&N 99-5050 Filter Care Service Kit.

In an analogous fashion to reservoir 30, the rinsing fluid reservoir 32 is coupled to the spray mechanism 24 in the device 100 of FIGS. 1-5 for selectively spraying rinsing fluid (water) onto the air filter 50 to be cleaned within the housing 10. A pump 36 is coupled to the rinsing fluid reservoir 32 for pumping rinsing fluid to the spray mechanism 24 for selectively spraying rinsing fluid onto the interior of the air filter 50 to be cleaned within the housing 12. The reservoir 32 includes an opening and lid for refilling the reservoir 32 with appropriate rinsing fluid by the user, namely water.

In the device 100 of FIGS. 1-5, a catch pan 38 is below the rotating plate 20 and is configured to receive debris from the air filter 50 to be cleaned and cleaning fluid and rinsing fluid used to clean the air filter 50 and the drain line 16 is coupled to the catch pan 38 and exits the housing for draining.

The method of cleaning an air filter 50 using the device of FIGS. 1-5 can be described in detail. First loose debris is often removed from the filter prior to use of the device 100. Then, with the device 100 turned off, the housing cover 12 is removed from the base of the housing 10. If the adapter 22 is not sized for the specific air filter 50 then the adjustable stops are properly positioned to receive and hold the air filter 50 in question and the air filter 50 is placed on the plate 20 within the adapter 22. The cleaning chamber cover 12 is reinstalled atop the housing base of housing 10 with the air filter 50 to be cleaned inside the cleaning chamber.

Using the control panel 14, the air filter cleaning device 100 is turned on by the operator. In so doing, motor 26 impart a spinning motion to the plate 20 and the associated air filter 50 to be cleaned. A low-speed wash cycle is initiated wherein a spraying mechanism 24 of the device is activated to spray the inside of the air filter 50 with cleaning fluid from reservoir 30 via pump 34. As one representative example, the wash cycle is about 15 minutes long. The control panel 14 can include other user inputs if there are different pre-programmed cycles for different sized air cleaners or possibly light and heavy clean option cycles. In general the user input 14 will simply be turning on the device 100 and advising the users of the particular state of operation (e.g. advising the user that the device 100 is in a washing, rinsing or drying cycle or that the complete cycle has been competed). The control panel may have other indicators such as advising that the device 100 needs more cleaning fluid or more rinsing fluid or that the cycle was prematurely stopped.

Following the wash cycle, a high-speed rinse cycle is initiated wherein the spraying mechanism 24 is activated to spray the inside of the air filter 50 with a rinse solution, such as water, from the reservoir 32 via pump 36. In one example, the rinse cycle is about 2 minutes long. The debris, wash water and rinse water collected by the pan 38 exits via the drain line 16 that can be appropriately placed to collect this waste water material.

Following the rinse cycle, a yet higher-speed drying cycle is initiated wherein the air filter 50 spins at a high RPM (Rotations Per Minute), much higher than the wash or rinse cycle rotation rates. In one example, the drying cycle is about 3 minutes long. At the completion of the wash, rinse, and drying cycles, the air filter cleaning device 100 turns off automatically. Then, the housing cover 12 can be opened and the clean air filter 50 can be removed and reused.

Figure 8:
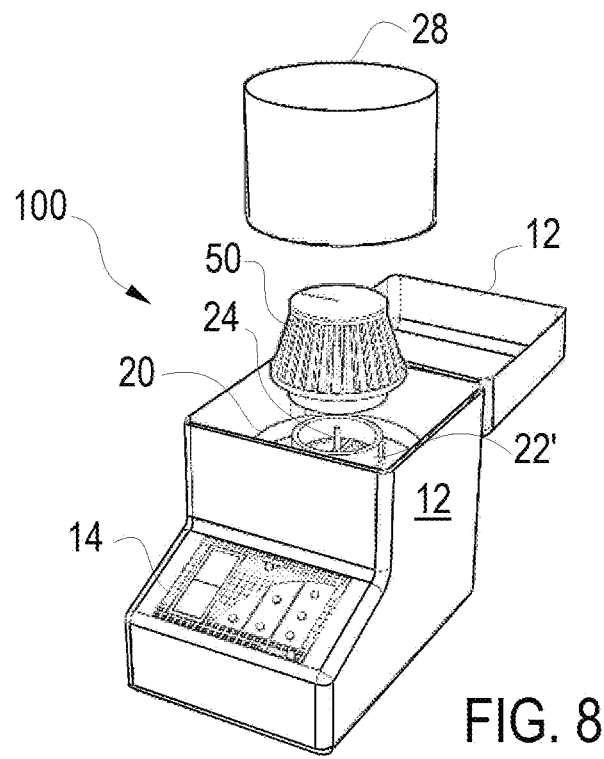
FIG. 8 is a perspective partially exploded view of a portable air filter cleaning device according to another embodiment of the present invention.

FIG. 8 is a perspective partially exploded view of a portable air filter cleaning device 100 according to another embodiment of the present invention. The device 100 of FIG. 8 is substantially similar to the device of FIGS. 1-5 described above except for a hinged housing cover 12, an removable fixed diameter adapter 22' and a shield 28 coupled to the plate 20. The hinged cover 12 merely shows an alternative coupling. The fixed diameter adapter 22' is removable attached to the plate with different sized adapters 22' used for distinct classes or sizes of filters 50. Preferably all of the distinct sizes of adapters 22' will nest together to allow for storage with in the housing when not in use. The shield 28 cooperates with the plate 20 and defines a smaller cleaning chamber (than in the device 100 of FIGS. 1-5 that is the entire interior of the housing cover 12) and is useful for concentrating the location of the debris and wash fluid and rinse fluid for the catch pan 38 and drain line 16. The operation of this device 100 of FIG. 8 is generally as discussed above.

FIGS. 9 and 10 are perspective views of a portable air filter cleaning device 100' according to another embodiment of the present invention used for cleaning flat plate style air filters 50'. The device 100' includes a housing 10, which includes a cover 12, configured to receive an air filter 50' to be cleaned; an user input (not shown), at least one spray mechanism 24' within the housing 10 for spraying fluid onto the air filter 50' to be cleaned within the housing 10; a cleaning fluid reservoir 30 coupled via pump (not shown) to at least one spray mechanism 24' for selectively spraying cleaning fluid onto the air filter 50' to be cleaned within the housing 10; a rinsing fluid reservoir 32 coupled via pump 36 to at least one spray mechanism 24' for selectively spraying rinsing fluid onto the air filter 50' to be cleaned within the housing 10; and a motor 26 for facilitating cleaning, rinsing and drying of the air filter 50' to be cleaned. A drain line 16 is coupled to a catch pan 38 below a plate 20' and the drain line will operate to drain from the housing debris from the air filter to be cleaned and cleaning fluid and rinsing fluid used to clean the air filter. The majority of these device components are as discussed above in connection with devices 100. The components of the device 100' not discussed in detail below are operationally the same as discussed above in the devices 100.

The first main distinction is that the air filter 50' will not be rotated during cleaning such that the plate 20' is stationary. The plate 20' may include adjustable adaptors in the form of slidable stops to accommodate and to center different size flat panel air filters 50' to be cleaned such as shown in the embodiment of FIGS. 11-13. The stops may be designed to minimize airflow around an air filter 50' and thus to focus the air flow through the air filter 50' to be cleaned. The motor 26 does not rotate the plate 20', but rather the motor 26 is coupled to a fan and selectively operates the fan inducing airflow within the housing 10 and primarily through the air filter 50' to be cleaned for facilitating cleaning, rinsing and drying of the air filter 50' to be cleaned. Essentially the fan creates an airflow that draws air from above the filter 50' through the filter 50' to the area above the catch pan 38. The inducement of air flow facilitates the washing rinsing and drying of the air filter 50'. The housing includes suitable openings or vents to allow for the induced airflow pattern from above the filter 50', through the filter 50' to below and out of the housing 10.

Additionally in the device 100' of FIGS. 9-10 the spray mechanism 24' includes a plurality of cleaning fluid nozzles coupled to the cleaning fluid cleaning fluid reservoir 30 via a pump for selectively spraying cleaning fluid onto the air filter 50' from above, and the spray mechanism 24' includes a separate plurality of rinsing fluid nozzles 24' coupled via pump 36 to the a rinsing fluid reservoir 32 for selectively spraying rinsing fluid onto the air filter 50' from above. The operation is similar to above in that the device 100' automatically progresses through a wash cycle, a rinse cycle and a drying cycle. The motor 26 can adjust the air flow characteristics during each cycle to maximize the cleaning.

FIGS. 11-13 schematically illustrate a portable air filter cleaning device 100' according to another embodiment of the present invention used for cleaning flat plate style air filters 50'. The device 100' of FIGS. 11-13 includes a housing 10, which includes a removable cover 12, configured to receive a flat air filter 50' to be cleaned; an user input (not shown), one spray mechanism 24' within the housing 10 for spraying fluid down onto the air filter 50' to be cleaned within the housing 10; a cleaning fluid reservoir 30 coupled via pump (not shown) the spray mechanism 24' for selectively spraying cleaning fluid onto the air filter 50' to be cleaned within the housing 10; a rinsing fluid reservoir 32 coupled via pump (not shown) to at least one spray mechanism 24' for selectively spraying rinsing fluid onto the air filter 50' to be cleaned within the housing 10 (with the spray cones 25, of either rinsing fluid or cleaning fluid, of the nozzles of the spray mechanism 24' shown in the schematic figure for clarity); and a motor (not shown) for facilitating cleaning, rinsing and drying of the air filter 50' to be cleaned. A drain line (not shown) is coupled to a catch pan 38 below a plate 20" and the drain line will operate to drain from the housing debris from the air filter to be cleaned and cleaning fluid and rinsing fluid used to clean the air filter. The majority of these device components are as discussed above in connection with devices 100. The components of the device 100' not discussed in detail below are operationally the same as discussed above in the devices 100.

Some of the flat air filters 52 can have a coupling flange around a perimeter. The device 100' of FIGS. 11-13 uses an support plate 20" upon which two adjustable adapters 22" slide to be supported under a mounting peripheral flange of the air filter 50'. The device 100' of FIGS. 11-13 uses a single spray mechanism 24' coupled to both the cleaning fluid reservoir 30 and the rinsing fluid reservoir 34 analogous to the device 100 discussed above, but sprays down on the flat air cleaner 50' similar to the device 100' of FIGS. 9-10.

In the device 100' of FIGS. 11-13 like that of FIGS. 9-10, the air filter 50' will not be rotated during cleaning such that the plate 20" is stationary. In the device 100' of FIGS. 11-13 like that of FIGS. 9-10, the motor (not shown in FIGS. 11-13 but 26 in FIGS. 9-10) does not rotate the plate 20", but rather the motor is coupled to a fan and selectively operates the fan inducing airflow within the housing 10 and primarily across and also through the air filter 50' to be cleaned for facilitating cleaning, rinsing and drying of the air filter 50' to be cleaned. Essentially the fan creates an airflow that draws air in via intake outlet 27 through a grated outlet 29 into the cleaning chamber across and possibly through the filter 50' to exit exhaust vents 31 in the housing. The outlet 29 and vents 31 may be positioned to maximize flow across and through the filter 50', and the cleaning chamber may be provided with baffles (not shown) to better direct the flow as desired. The inducement of air flow facilitates the washing rinsing and drying of the air filter 50'.

The air flow assist of the devices 100' that directs air flow across or through the filter 50' being cleaned could also be implemented with the device 100 of FIGS. 1-5 in an alternative configuration with the induced flow being from inside the spinning air filter 50 to outside, and a separate motor and fan would need to be provided for this addition, however this proposed alteration is not believed to be required with the spinning aspects of that design. The operation is similar to above in that the device 100' of FIGS. 11-13 automatically progresses through a wash cycle, a rinse cycle and a drying cycle. The motor 26 can adjust the air flow characteristics during each cycle to maximize the cleaning process.

While the invention has been shown in several particular embodiments it should be clear that various modifications may be made to the present invention without departing from the spirit and scope thereof. The scope of the present invention is defined by the appended claims and equivalents thereto.

What is claimed is:

1. A portable air filter cleaning device, comprising:
   a housing configured to receive an air filter to be cleaned;
   at least one spray mechanism within the housing for spraying fluid onto the air filter to be cleaned within the housing;
   a cleaning fluid reservoir coupled to at least one spray mechanism for selectively spraying cleaning fluid onto the air filter to be cleaned within the housing;
   a cleaning fluid pump coupled to the cleaning fluid reservoir for selectively pumping cleaning fluid to at least one spray mechanism for selectively spraying cleaning fluid onto the air filter to be cleaned within the housing;
   a rinsing fluid reservoir coupled to at least one spray mechanism for selectively spraying rinsing fluid onto the air filter to be cleaned within the housing;
   a rinsing fluid pump coupled to the rinsing fluid reservoir for selectively pumping rinsing fluid to at least one spray mechanism for selectively spraying rinsing fluid onto the air filter to be cleaned within the housing;
   a motor for facilitating cleaning, rinsing and drying of the air filter to be cleaned;
   a controller configured to control a wash cycle, a rinse cycle and a drying cycle; and
   a rotating plate within the housing, selectively supporting the air filter, wherein the rotating plate is selectively driven by the motor for rotating the air filter to be cleaned automatically by the controller.

2. The portable air filter cleaning device according to claim 1, further including an adaptor on the rotating plate sized to the air filter to be cleaned, and wherein the motor is configured to rotate the rotating plate and air filter to be cleaned at a first speed for cleaning and rinsing of the air filter to be cleaned and a higher speed for drying of the air filter to be cleaned.

3. The portable air filter cleaning device according to claim 2 wherein the adaptor on the rotating plate is an adjustable adaptor having a plurality of radially adjusting members on the rotating plate, and wherein the motor is a 12-volt DC, variable speed motor.

4. The portable air filter cleaning device according to claim 1, wherein at least one spray mechanism includes at least one nozzle configured to spay an internal surface of the air filter to be cleaned, and wherein the motor is configured to rotate the rotating plate and air filter to be cleaned at a first speed for cleaning and rinsing of the air filter to be cleaned and a higher speed for drying of the air filter to be cleaned.

5. The portable air filter cleaning device according to claim 4 including a pair of nozzles with outlets angled relative to each other to spray distinct portions of the air filter to be cleaned, and wherein the motor is a 12-volt DC, variable speed motor.

6. The portable air filter cleaning device according to claim 4 further including a catch pan below the rotating plate configured to receive debris from the air filter to be cleaned and cleaning fluid and rinsing fluid used to clean the air filter, and wherein the motor is a 12-volt DC, variable speed motor.

7. The portable air filter cleaning device according to claim 6 further including a drain line coupled to the catch pan and exiting the housing.

8. The portable air filter cleaning device according to claim 1, wherein the motor is configured to rotate the rotating plate and air filter to be cleaned at a first speed for cleaning and rinsing of the air filter to be cleaned and a higher speed for drying of the air filter to be cleaned.

9. A portable air filter cleaning device comprising:
   a housing configured to receive an air filter to be cleaned;
   at least one spray mechanism within the housing for spraying fluid onto the air filter to be cleaned within the housing;
   a cleaning fluid reservoir coupled to at least one spray mechanism for selectively spraying cleaning fluid onto the air filter to be cleaned within the housing;
   a cleaning fluid pump coupled to the cleaning fluid reservoir for selectively pumping cleaning fluid to at least one spray mechanism for selectively spraying cleaning fluid onto the air filter to be cleaned within the housing;
   a rinsing fluid reservoir coupled to at least one spray mechanism for selectively spraying rinsing fluid onto the air filter to be cleaned within the housing;
   a rinsing fluid pump coupled to the rinsing fluid reservoir for selectively pumping rinsing fluid to at least one spray mechanism for selectively spraying rinsing fluid onto the air filter to be cleaned within the housing;
   a motor for facilitating cleaning, rinsing and drying of the air filter to be cleaned; and
   a controller configured to automatically controlling the air cleaning device through a wash cycle, a rinse cycle and a drying cycle for the air filter to be cleaned within the housing.

10. The portable air filter cleaning device according to claim 9 wherein the motor is a 12-volt DC, variable speed.

11. The portable air filter cleaning device according to claim 1 wherein the device is configured to operate via an external power source.

12. The portable air filter cleaning device according to claim 1 wherein the at least one spray mechanism within the housing for spraying fluid onto the air filter to be cleaned within the housing includes at least one cleaning fluid nozzle coupled to the cleaning fluid cleaning fluid reservoir for selectively spraying cleaning fluid onto the air filter to be cleaned within the housing and at least one rinsing fluid nozzle coupled to the a rinsing fluid reservoir for selectively spraying rinsing fluid onto the air filter to be cleaned within the housing.

13. The portable air filter cleaning device according to claim 1 further including a fan inducing airflow within the housing wherein the motor is coupled to the fan and selectively operates the fan inducing airflow within the housing and across and/or through the air filter to be cleaned for facilitating cleaning, rinsing and drying of the air filter to be cleaned.

14. The portable air filter cleaning device according to claim 13 further including a catch pan below an air filter receiving plate within the housing, wherein the catch pan is configured to receive debris from the air filter to be cleaned and cleaning fluid and rinsing fluid used to clean the air filter.

15. The portable air filter cleaning device according to claim 14 further including a drain line coupled to the catch pan and exiting the housing.

* * * * *